(12) United States Patent  (10) Patent No.: US 9,141,372 B1
Sarkar et al.  (45) Date of Patent: Sep. 22, 2015

(54) SECURE AND INTERRUPTIBLE TRANSFER OF A MAP UPDATE PACKAGE TO A NAVIGATION DEVICE

(71) Applicant: GM GLOBAL TECHNOLOGY OPERATIONS LLC, Detroit, MI (US)

(72) Inventors: Susanta P. Sarkar, Rochester Hills, MI (US); Ansaf I. Alrabady, Livonia, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/310,757

(22) Filed: Jun. 20, 2014

(51) Int. Cl.
 G01C 21/36 (2006.01)
 G06F 9/445 (2006.01)
 G06F 17/30 (2006.01)
 H04L 29/08 (2006.01)
 H04L 9/32 (2006.01)
 H04L 9/30 (2006.01)

(52) U.S. Cl.
 CPC ............. *G06F 8/65* (2013.01); *G06F 17/3033* (2013.01); *H04L 9/30* (2013.01); *H04L 9/3242* (2013.01); *H04L 9/3247* (2013.01); *H04L 67/10* (2013.01); *H04L 2209/24* (2013.01); *H04L 2209/64* (2013.01)

(58) Field of Classification Search
 CPC ........... G01C 21/36; G01C 21/20; G06G 3/00
 USPC .......................................................... 701/450
 See application file for complete search history.

(56) References Cited

U.S. PATENT DOCUMENTS 8,249,801 B2 * 8/2012 Sakai et al. ................... 701/408
8,261,083 B2 * 9/2012 Nakamura et al. ............ 713/176

FOREIGN PATENT DOCUMENTS

WO    WO 2011102164 A1 * 8/2011

* cited by examiner

*Primary Examiner* — Mary Cheung
*Assistant Examiner* — Brian P Sweeney
(74) *Attorney, Agent, or Firm* — Leydig, Voit & Mayer, Ltd.

(57) ABSTRACT

A method is provided for performing a map update for a navigation device. The method includes: receiving a manifest file corresponding to a map update package and receiving a digital signature corresponding to the manifest file, wherein the map update package comprises a plurality of pieces; verifying, by a processor, the digital signature; receiving, after successful verification of the digital signature, a piece of the map update package to be written to a storage of the navigation device; verifying, by the processor, the received piece using the received manifest file; and writing, in response to successful verification of the received piece, the received piece to the storage of the navigation device.

20 Claims, 3 Drawing Sheets

SECURE AND INTERRUPTIBLE TRANSFER OF A MAP UPDATE PACKAGE TO A NAVIGATION DEVICE

BACKGROUND

The use of satellite-based navigation in satellite-based navigation devices is becoming more and more prevalent. Many vehicle operators rely solely on such navigation devices to provide them with turn-by-turn directions to reach their intended destinations. However, map conditions and address information are subject to changes, as some roads are added and others are removed, as well as with the opening and closing of various businesses. And, given the enormous amount of map-related data available, keeping the map information up-to-date in a vehicle and/or on a navigation device is a difficult task.

Many systems generally rely on a user to update the maps stored locally at a navigation device, for example, on an annual basis, by securely transferring map data from a computer-readable medium to the navigation device. One conventional way of transferring the data is via a Universal Serial Bus (USB) connection. Another way is to insert one or more DVD-ROMs containing the map data into an optical drive and read the data from the optical drive.

Because this map data includes a large amount of information and may be made up of thousands of files, this process can take a very long time, and it is inconvenient for a user to keep the navigation device continuously powered on for the amount of time required for updating the maps (which may take hours). This is especially problematic for a navigation device of a vehicle, as the vehicle is required to remain on. Additionally, if the update is interrupted, for example, by the navigation device powering off or the map data source being disconnected (either inadvertently or intentionally), the update process must start over from the beginning. This is to ensure that the update package for map data is authentic, from a trusted source, and has not been tampered with.

SUMMARY

Implementations of the invention provide for a user-friendly and secure map updating process that allows for the transfer of a large multi-component update package to a navigation device, where the transfer can be restarted from a point of interruption without compromising security. During an update of the map, it is not required for the navigation device (and/or the vehicle associated therewith) to remain on for a long continuous period of time. The update may be stopped and resumed from the point of interruption, allowing for the navigation device (and/or the vehicle associated therewith) to be turned on and off as desired without affecting the total time needed for the navigation device to be in an on state to complete the update.

In an implementation, a method is provided for performing a map update for a navigation device. The method includes: receiving a manifest file corresponding to a map update package and receiving a digital signature corresponding to the manifest file, wherein the map update package comprises a plurality of pieces; verifying, by a processor, the digital signature; receiving, after successful verification of the digital signature, a piece of the map update package to be written to a storage of the navigation device; verifying, by the processor, the received piece using the received manifest file; and writing, in response to successful verification of the received piece, the received piece to the storage of the navigation device.

BRIEF DESCRIPTION OF THE SEVERAL VIEWS OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

In general terms, not intended to limit the claims, systems and methods are described herein for efficiently performing a secure map update operation while allowing for interruptions without compromising security. The map update operation utilizes a multi-component map update package that includes a plurality of pieces mapped to a corresponding manifest file. The manifest file contains the results of a cryptographic algorithm (e.g., a hash function) being applied to each of the plurality of pieces, and a signature of the manifest file is used to verify the integrity of the multi-component map update package. Transfer of the map update package can thus be stopped and restarted in a secure and efficient manner by checking the signature of the manifest file each time the transfer is resumed, and further by checking the hash result of each piece of the map update package against the manifest file before writing it into storage of the navigation device.

Figure 1:
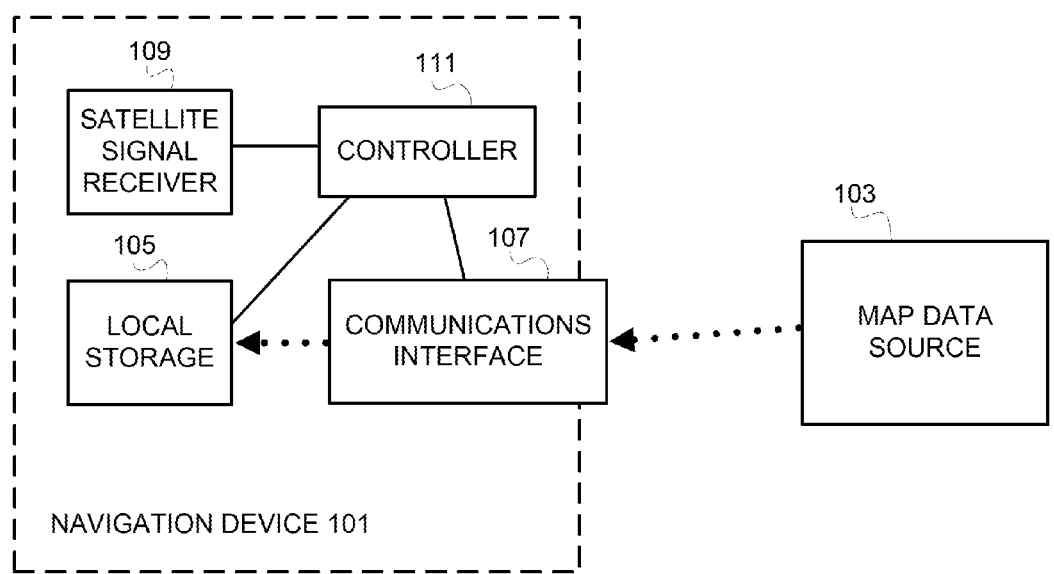
FIG. 1 is a schematic block diagram of an operating environment for a mobile vehicle navigation device usable in implementations of the described principles.

FIG. 1 is a block diagram illustrating an exemplary environment for implementations of the invention that depicts certain components of a navigation device 101 and a source for updated map data 103. The source for map data 103 is connected to the navigation device 101 through a communication channel and a communication interface 107. In different implementations, the source for map data 103 and the communication interface 107 take on different forms. For example, where the map data is stored on a USB drive (such as a USB stick), the source 203 is the USB drive, the communication interface 107 is a USB port, and map updating takes place over a USB connection between the source 103 and the USB port. In another example, where the map data is stored on one or more DVD-ROMs, the source 103 is the one or more DVD-ROMS, and the communication interface 107 may be an optical drive capable of reading DVDs or a connection to an external optical drive capable of reading DVDs, and the map updating takes place by reading the map data off the one or more DVD-ROMS. In another example, where the map data is stored on a server, the source 103 is the server, the communication interface 107 may be a wireless communications transceiver (e.g., for wireless local area networking (WLAN) or for cellular communications) or a port for a wired connection (e.g., such as an Ethernet port), and the map updating takes place over a wireless communications channel (e.g., for cellular or WLAN communications) or a wired connection (e.g., an Ethernet cable). It will be appreciated that other types of storage media and communication interfaces can be used as the source for map data 103 and the communications interface 107 as well.

The map data is stored at a local storage 105 of the navigation device 101. It will be appreciated that the navigation device further includes other components, for example, such as a satellite signal receiver 109 and a controller 111 that interact with the local storage 105 and the communication interface 107 to provide navigation functionality to a user (such as indicating a vehicle's current location on a displayed map). The navigation device 101 may further include other components that are not depicted, such as a display screen and a user input interface (e.g., through a touchscreen display or through buttons), as well as audio hardware such as speakers for providing vocal navigation instructions and/or audio notifications. The navigation device may further include sensors used for dead reckoning-based navigation as well.

In an implementation, the satellite signal receiver 109 is a Global Navigation Satellite System (GNSS) receiver such as a Global Positioning System (GPS) receiver. Based on the satellite positioning signals received by the satellite signal receiver 109 (and/or other navigation sensors of the navigation device 101), the navigation device 101 is able to provide navigation guidance and/or display the position of the navigation device 101 on a screen, based on control of the navigation device 101 by the controller 111. When map updating is being performed, the controller 111 facilitates digital signature verification and hash checking functions, as well as determination of map update progress.

It will be appreciated by those of skill in the art that the execution of the various machine-implemented processes and steps described herein may occur via the computerized execution of computer-executable instructions stored on a tangible computer-readable medium, e.g., RAM, ROM, PROM, volatile, nonvolatile, or other electronic memory mechanism. Thus, for example, the operations performed by the controller 111 may be carried out according to instructions and applications stored at the navigation device 101.

Implementations of the invention are particularly well-suited for "on-board navigation" contexts, where map data is stored locally, and a connection to a wireless communications network is not needed for routing and other navigation guidance functionality. However, even with respect to devices, such as telematics units, capable of "off-board navigation" using partial map data downloaded on the fly, implementations of the invention may also be used to store and/or update map data where local storage of map data is needed (e.g., in a situation where a user wishes to locally store a large amount of map data for a planned trip that traverses an area in which wireless communication with a navigation server is unlikely to be available).

Figure 2:
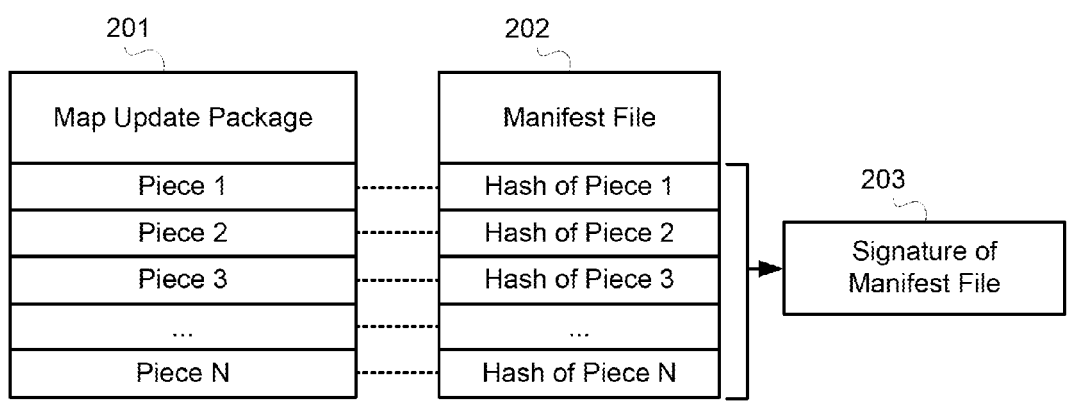
FIG. 2 depicts an exemplary configuration for a map update package in an exemplary implementation of the described principles.

FIG. 2 depicts an exemplary configuration for a map update package 201 in one exemplary implementation. The map update package 201 includes several pieces (labeled 1 through N). These pieces may be individual files or file chunks that are to be transferred to the storage of a navigation device as part of a map update operation. The map update package 201 is associated with a manifest file 202 that contains unique hash values corresponding to each of the pieces of the map update package 201.

In the example depicted by FIG. 2, these hash values have a one-to-one correspondence with the pieces of the map update package 201. It will be appreciated that this one-to-one correspondence is not necessarily required, and that multiple pieces of the map update package 201 may be concatenated for hashing as well, such that one hash value may correspond to a combination of multiple pieces.

The map update package 201 and the manifest file 202 are further associated with a detached digital signature 203, which is based on the contents of the manifest file 202. It will be appreciated that the map data files of the map update package 201, manifest file 202 and detached digital signature 203 may be maintained separately. In one exemplary implementation, the digital signature 203 is obtained using an asymmetric cryptographic algorithm—i.e., by applying a private key to the manifest file. In this exemplary implementation, a public key known to the navigation device is used to decrypt the digital signature 203 and verify that the digital signature 203 is being provided by a trusted source.

Generally, the map update package 201 will be very large and include, for example, several gigabytes (GBs) of map data. The manifest file 202 however, is relatively very small compared to the map update package 201, e.g., around 10 kilobytes (kBs). The digital signature 203 is even smaller, for example, at around 256 bytes. This allows implementations of the invention to achieve the advantage of quickly verifying the integrity of the entire map update package 201, which is very large, through an efficient authentication process that requires the use of only one digital signature (together with hashing of each downloaded piece of map data). Implementations of the invention are also efficient from the standpoint of the map data provider, which needs only to send the manifest file (as opposed to the contents of the entire map update package) to a signing server to produce the detached digital signature.

Figure 3:
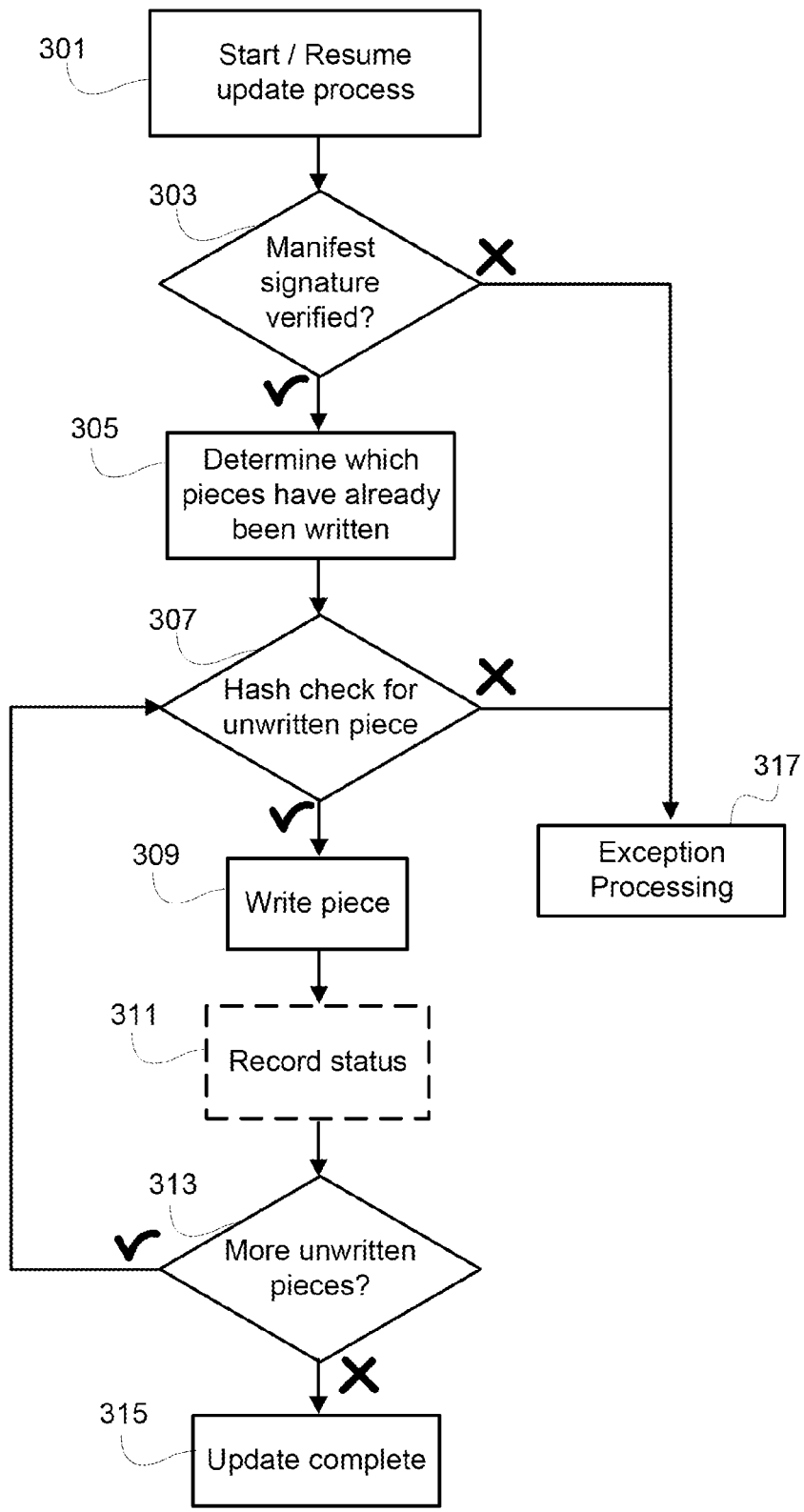
FIG. 3 depicts an exemplary flowchart illustrating a map update process according to an exemplary implementation of the described principles.

FIG. 3 depicts an exemplary flow chart illustrating the processing that occurs when a map update is started or resumed. At stage 301, the map updating process is started or resumed, for example, in response to a trigger such as the navigation device being connected to a map data source or the vehicle being turned on, or a user providing input to start or resume the map updating process.

At stage 303, the navigation device verifies that the map update package is authentic by decrypting the detached digital signature associated with the map update package, e.g., by applying a public key to the detached digital signature. Through this cryptographic operation, the navigation device determines whether the source of the map update package and manifest file is a trusted source, which verifies whether the manifest file is valid.

If the manifest signature is not verified, exception processing is performed at stage 317—for example, stopping the map update process and notifying a user (and/or the map data provider) that the digital signature was unable to be verified.

If the manifest signature is successfully verified, the navigation device determines at stage 305 which pieces of the map update package have already been transferred to local storage, for example, by searching through storage of the navigation device or by checking a stored file index corresponding to the map update process reflecting which pieces of the map update package have previously been written. The file index may be updated whenever a new piece is written or whenever the map update is interrupted. In one implementation, the file index contains hash values corresponding to each completed file piece that has been transferred to local storage, and the determination at stage 305 includes determining which hash entries from the manifest file correspond to hash entries in the file index. For example, the determination at stage 305 may be performed by going through the manifest file in a sequential order and checking whether each piece has been written one-by-one, until the navigation device finds a hash entry in the manifest file that has no corresponding hash entry in the file index.

It will be appreciated that this determination at stage 305 is not needed if the map update process was started at stage 301 (as opposed to the map update process being resumed at stage 301), and that this determination at stage 305 may be skipped in such instances where the map update process is being started from the very beginning.

At stage 307, the navigation device performs a hash check on a piece of the map update package that has been transferred to the navigation device but has not yet been written into the local storage of the navigation device. For example, the hash check is performed after the navigation device has the unwritten piece in a temporary storage. In one exemplary implementation, the hash check at stage 307 involves the navigation device performing a hash function on the unwritten piece and comparing the results of the hash function with a corresponding entry in the received manifest file (which was previously verified at stage 303). In an exemplary implementation, the SHA-256 hash algorithm is used, but it will be appreciated that other hash algorithms and cryptographic function may be used in other implementations.

If the hash check for the unwritten piece is unsuccessful, exception processing is performed at stage 317—for example, stopping the map update process and notifying a user and/or map data provider that a piece of the map update package was unable to be verified. It will be appreciated that exception processing at stage 317 with respect to failure of signature verification at stage 303 may be the same or may be different from exception processing at stage 317 with respect to failure of the hash check for an unwritten piece at stage 307.

If the hash check for a particular unwritten piece is successful, the piece is written to the storage of the navigation device at stage 309. At stage 311, the status of the update may be recorded, for example, in a locally-stored file index that indicates which pieces of the map update package have already been written (which facilitates the determination at stage 305). In some implementations, the status may not be recorded at all, and the determination at stage 305 may rely on a scan of the navigation device's storage rather than looking to previously-stored status information (such as previously-stored hash entries in a file index) regarding which pieces have been written.

The navigation device determines whether there are more unwritten pieces at stage 313, for example, based on whether more pieces are available from the map data source or based on a comparison of a manifest file with a record of what pieces have already been written. If more unwritten pieces exist, the process returns to stage 307 and looks at the next unwritten piece that is to be checked and potentially written. If no more unwritten pieces exist, the process moves to stage 315 where map update operation is complete, and appropriate actions may be taken in response thereto (such as providing notification to a user and/or deleting information that is no longer necessary such as records of the update status).

In various exemplary implementations, the order in which pieces of the map update package are processed may be based on a specific sequence of pieces dictated by the map update package itself or by the map data source, or may be chosen according to certain criteria (e.g., assigning the pieces different levels of priority based on size, importance, information type, etc.), or may be arbitrarily chosen. In one exemplary implementation, the pieces are simply processed sequentially, for example with reference to FIG. 2, from piece 1 to piece N.

It will be appreciated that the steps depicted in FIG. 3 need not occur in the precise order shown. For example, in an alternative implementation, the hash check may be performed after a file piece is written to the local storage, with the file piece being deleted or removed if the hash check fails (as part of the exception processing). Similarly, recording the status (stage 311) may take place at other points in the process, such as after an interruption in the map update process is detected, or after a group of pieces has been written.

At any point during the map update process, the process may be interrupted. For example, in the context of a vehicle-based navigation device, the map update stops when the vehicle is turned off (or the power source for the navigation device is otherwise disconnected). When the vehicle is turned back on (and/or when the navigation device is reconnected to a map data source and/or power source), the map update process is resumed at stage 301 as depicted in FIG. 3. In one implementation, if the process was stopped during stage 309 while an unwritten piece was being written to storage, and only a part of the piece was written, the part that was written may be discarded and the next time the process reaches stage 309 with respect to that piece, it will write that piece to storage from the beginning. In another implementation, the part of the piece that was written is retained in storage, and when the process reaches stage 309 again, the writing process will pick up where it left off (after having performed the hash check on the piece).

It will thus be appreciated that implementations of the invention provide for an efficient way to ensure that the map update process is secure such that map data that has been tampered with (such as by inserting extraneous material such as advertisements or malware, or by modifying map content in an unauthorized manner) are identified and unauthorized/invalid map data from an unauthorized/invalid source is not transferred to the storage of a navigation device. Further, while conventional map update processes require the navigation device to stay on for extended periods of time (such as an hour or longer), implementations of the invention allow for interruptions in the map update such that a user updating the map data of the navigation device is able to turn the navigation device (and the vehicle associated therewith) on and off as desired, providing a user-friendly and convenient user experience.

It will further be appreciated that, although implementations of the invention discussed herein have particularly been discussed in the context of map update packages, the same principles may be applied in other contexts as well, where transfer of a large amount of data is to be completed in a secure and efficient manner (e.g., such as transfer of a music file repository).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred implementations of this invention are described herein, including the best mode known to the inventors for carrying out the invention. Variations of those preferred implementations may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for performing a map update for a navigation device, the method comprising:
   receiving a manifest file corresponding to a map update package and receiving a digital signature corresponding to the manifest file, wherein the map update package comprises a plurality of pieces;
   verifying, by a processor, the digital signature;
   receiving, after successful verification of the digital signature, a piece of the map update package to be written to a storage of the navigation device;
   verifying, by the processor, the received piece using the received manifest file; and
   writing, in response to successful verification of the received piece, the received piece to the storage of the navigation device.

2. The method according to claim 1, further comprising:
   initiating, by the processor, a transfer of map update package from a map data source to the navigation device;
   interrupting the transfer before the map update package is completely transferred to the navigation device;
   resuming, by the processor, the transfer of the map update package; and
   determining, after resuming the transfer, which pieces of the map update package have previously been written to the storage of the navigation device.

3. The method according to claim 2, wherein determining which pieces of the map update package have previously been written is based on an index reflecting which pieces of the map update package have previously been written.

4. The method according to claim 3, wherein the index comprises hash values corresponding to each of the pieces of the map update package that have previously been written.

5. The method according to claim 1, further comprising:
   determining, after writing the received piece, whether any other pieces of the map update package are to be transferred to the navigation device.

6. The method according to claim 1, wherein a failure to verify the signature of the manifest file results in exception processing being performed by the processor, wherein the exception processing includes notification to a user of the navigation device.

7. The method according to claim 1, wherein a failure to verify the received piece results in exception processing being performed by the processor, wherein the exception processing includes notification to a user of the navigation device.

8. The method according to claim 1, wherein verifying the digital signature further comprises:
   applying a public key to the digital signature.

9. The method according to claim 1, wherein verifying the received piece comprises:
   applying a hash function to the received piece so as to obtain a hash result; and
   comparing the hash result to a corresponding entry in the manifest file.

10. The method according to claim 9, wherein the hash function applied to the unwritten piece utilizes the SHA-256 algorithm.

11. A non-transitory processor-readable medium having processor-executable instructions stored thereon for performing a map update for a navigation device, the processor-executable instructions, when executed by a processor, facilitating the performance of the following steps:
    receiving a manifest file corresponding to a map update package and receiving a digital signature corresponding to the manifest file, wherein the map update package comprises a plurality of pieces;
    verifying the digital signature;
    receiving, after successful verification of the digital signature, a piece of the map update package to be written to a storage of the navigation device;
    verifying the received piece using the received manifest file; and
    writing, in response to successful verification of the received piece, the received piece to the storage of the navigation device.

12. The non-transitory processor-readable medium of claim 11, wherein the steps further include:
    initiating a transfer of map update package from a map data source to the navigation device;
    interrupting the transfer before the map update package is completely transferred to the navigation device;
    resuming the transfer of the map update package; and
    determining, after resuming the transfer, which pieces of the map update package have previously been written to the storage of the navigation device.

13. The non-transitory processor-readable medium of claim 12, wherein determining which pieces of the map update package have previously been written is based on an index reflecting which pieces of the map update package have previously been written.

14. The non-transitory processor-readable medium of claim 13, wherein the index comprises hash values corresponding to each of the pieces of the map update package that have previously been written.

15. The non-transitory processor-readable medium of claim 11, wherein the steps further include:
    determining, after writing the received piece, whether any other pieces of the map update package are to be transferred to the navigation device.

16. The non-transitory processor-readable medium of claim 11, wherein a failure to verify the signature of the manifest file results in exception processing being performed, wherein the exception processing includes notification to a user of the navigation device.

17. The non-transitory processor-readable medium of claim 11, wherein a failure to verify the received piece results in exception processing being performed, wherein the exception processing includes notification to a user of the navigation device.

18. The non-transitory processor-readable medium of claim 11, wherein verifying the digital signature further comprises:
   applying a public key to the digital signature.

19. The non-transitory processor-readable medium of claim 11, wherein verifying the received piece comprises:
   applying a hash function to the received piece so as to obtain a hash result; and
   comparing the hash result to a corresponding entry in the manifest file.

20. The non-transitory processor-readable medium of claim 19, wherein the hash function applied to the unwritten piece utilizes the SHA-256 algorithm.

* * * * *